Patented Aug. 28, 1945

2,383,443

UNITED STATES PATENT OFFICE 2,383,443

CYANO-ALKYL ETHERS OF POLYHYDRIC ALCOHOLS

Herman A. Bruson, Philadelphia, Pa., assignor to The Resinous Products & Chemical Company, Philadelphia, Pa., a corporation of Delaware No Drawing. Application October 11, 1941, Serial No. 414,597

6 Claims. (Cl. 260—464)

This invention relates to ω-cyano-isopropyl ethers of polyhydric alcohols having two to six hydroxyl groups per molecule and to a method for their preparation.

This application is a continuation-in-part of co-pending applications Serial No. 374,603, filed January 15, 1941, and Serial No. 404,624, filed July 30, 1941.

According to this invention, a polyhydric alcohol of the aliphatic, cycloaliphatic, or aryl-aliphatic series having two to six (inclusive) hydroxyl groups in the molecule is reacted in the presence of an aqueous alkaline condensing agent with reacting proportions of a member of the group consisting of allyl cyanide and crotononitrile to form an ω-cyano-isopropyl ether of the polyhydric alcohol. During the condensation, the allyl cyanide undergoes rearrangement by the action of the aqueous alkali to crotononitrile which in turn adds the polyhydric alcohol to its $\alpha,\beta$-double bond, so that the same ω-cyano-isopropyl ether is formed in either case. Depending upon the proportion of the unsaturated nitrile used, one or more ω-cyano-isopropyl groups may be introduced.

The reaction is applicable to a wide variety of polyhydric alcohols of the aliphatic, cycloaliphatic, and arylaliphatic series. These can be saturated or unsaturated in character and may be interrupted by one or more ether-like oxygen or sulfur atoms in their molecule.

Typical polyhydric alcohols suitable for the purpose of this invention are ethylene glycol or its homologues, including, for example, propylene, butylene, amylene, hexylene, octylene, dodecylene, and octadecylene glycol, furthermore polymethylene glycols such as trimethylene, tetramethylene, pentamethylene, hexamethylene and decamethylene glycol. Polyalkylene glycols may also be used, for example diethylene glycol, dipropylene glycol, triethylene glycol, tetraethylene glycol, hexaethylene glycol, nonaethylene glycol and higher wax-like polyethylene glycols, also sulfur analogues thereof such as thio-diethylene glycol $HOCH_2CH_2SCH_2CH_2OH$. Unsaturated glycols such as dipropenyl glycol or divinyl glycol are also suitable, furthermore higher polyhydric alcohols such as glycerol, pentaerythrite, trimethylolpropane-1,1,1, sorbitol, mannitol, inositol, diglycerol, polyglycerol, glyceryl-α-phenyl ether, glyceryl-α-methyl ether, cyclohexane-diols, 1,2-di-(β-hydroxyethyl)-benzene, bis-(β-hydroxyethoxy)-benzene, xylylene glycol and the like. Tertiary amino-polyhydric alcohols such as triethanolamine or tri-isopropanolamine may also be used.

Among the alkaline condensing agents which are suitable for promoting the reaction, the most effective are alkali metal hydroxides or quaternary ammonium hydroxides in aqueous solution, since they cause practically no polymerization of the nitriles and can be mixed with solid polyhydric alcohols which are only soluble in water. Particularly useful are sodium hydroxide, potassium hydroxide, lithium hydroxide and tri-methyl benzyl ammonium hydroxide. The latter is available commercially in the form of an aqueous 40% solution under the trade name "Triton B."

The quantity of alkaline condensing agent used is small, catalytic amounts corresponding on the dry basis to 0.5 to 5% on the weight of the polyhydric alcohol used being usually sufficient. The catalyst in aqueous solution (preferably concentrated) may be mixed directly with the polyhydric alcohol if it be a liquid, or with a solution of the polyhydric alcohol in water, dioxane, tertiary butyl alcohol or other suitable inert liquid.

The condensation takes place readily at ordinary room temperature and even proceeds at 0° C. although slowly. The reaction is greatly accelerated at 40° to 95° C. Higher temperatures tend to destroy the catalyst by saponification of the nitrile.

Since the reaction is exothermal, it is advantageous to moderate the vigor of the condensation by cooling at the start and by gradually adding the unsaturated nitrile so as to control the temperature within the desired limits.

The ω-cyano-isopropyl ethers of the polyhydric alcohols obtained by the present process are new compounds which are of value as intermediates for the preparation of synthetic resins, plasticizers, drugs and insecticides. They may be converted into monocarboxylic acids, polycarboxylic acids, and into the corresponding amides, amines, amidines and thioamides by appropriate reactions involving the nitrile group.

The following examples illustrate this invention:

EXAMPLE 1

Bis-(ω-cyano-isopropoxy)-ethane-1,2

To a mixture of 31 g. of ethylene glycol and 10 g. of aqueous 40% trimethyl benzyl ammonium hydroxide there is added dropwise 67 g. of allyl cyanide while the reaction mixture is stirred and maintained at a temperature of 40–42° C. by external cooling. After the addition, which requires about 40 minutes, the mixture is stirred for 24 hours at ordinary room temperature. Dilute hydrochloric acid (10%) is then added until the solution becomes acid towards litmus. The product is shaken with a mixture of 150 cc. of ethylene dichloride and 25 cc. of water and the two layers separated. The lower ethylene dichloride layer is evaporated to dryness and the residual oil weighing 77 g. is distilled in vacuo. The fraction coming over at 154–156° C./1 mm. is collected. It is a colorless, water-soluble liquid, boiling at 197–198° C./11 mm. having a specific gravity at 25° C. of 1.0161 and $N_D^{25}$ 1.4454 having the formula:

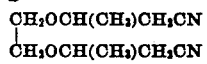

A small amount of monosubstituted derivative

NCCH₂CH(CH₃)CH₂OCH₂CH₂OH is also obtained. It is a colorless liquid boiling at 115° C./1 mm.

Example 2

*Bis-(ω-cyano-isopropoxy)-propane-1,2*

To a mixture of 76 g. of propylene glycol-1,2 and 20 g. of aqueous 40% trimethyl benzyl ammonium hydroxide there is added dropwise during 1½ hours 134 g. of allyl cyanide while the reaction mixture is stirred and maintained at a temperature between 40° and 45° C. The mixture is then stirred at 50–55° C. for six hours and allowed to stand 48 hours at room temperature. It is made faintly acid with 10% hydrochloric acid and shaken with a mixture of 25 cc. of water and 200 cc. of ethylene dichloride. The lower ethylene dichloride layer is separated from the upper aqueous layer, and is evaporated to dryness under reduced pressure at 90–100° C. The residual oil weighing 176 g. is distilled in vacuo. The fraction (50 g.) distilling over at 158–162° C./1–2 mm. is a pale yellow liquid having a specific gravity at 25° C. of 0.9995 and $N_D^{25}$ 1.4462, and having the formula:

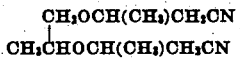

A lower boiling fraction (B. P. 100–158° C./1 mm.) weighing 96 g. is also obtained which upon careful refractionation yields a mixture of mono-(ω-cyano-isopropoxy)-propanols-1,2 boiling at 130–137° C./10 mm.

Example 3

*Bis-(ω-cyano-isopropoxy) diethyl ether*

Allyl cyanide (134 g.) is added dropwise to a stirred solution of 106 g. of diethylene glycol and 20 g. of aqueous 40% trimethyl benzyl ammonium hydroxide during the course of one and one-third hours while maintaining the exothermal reaction at 40–45° C. The mixture is then heated at 50° C. for six hours, cooled, acidified with 10% hydrochloric acid and extracted with an equal volume of ethylene dichloride. The water layer is discarded and the ethylene dichloride layer evaporated to dryness in vacuo on a steam bath. The residual oil weighing 202 g. gives, upon fractionation at 1 mm., two main cuts as follows:

I. 140°–178° C./1 mm.—88.5 g. pale yellow oil
II. 180°–190° C./1 mm.—85.5 g. pale yellow oil.

Upon refractionation, cut I yields the mono-substituted derivative

NCCH₂CH(CH₃) CH₂OCH₂CH₂OCH₂CH₂OH boiling at 145° C./1 mm. as a pale yellow oil whereas cut II consists of the di-substituted derivative

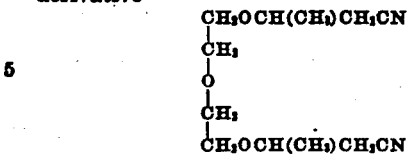

It is a pale yellow oil which upon refractionation boils at 190°–195° C./2 mm. having a specific gravity at 25° C. of 1.0374 and $N_D^{25}$ 1.4511.

Example 4

Allyl cyanide (134 g.) is added dropwise to a stirred solution of 122 g. of thiodiethylene glycol HOCH₂CH₂SCH₂CH₂OH, 50 g. of tertiary butanol and 10 g. of aqueous 40% trimethyl benzyl ammonium hydroxide during the course of one and one-half hours while the exothermal reaction mixture was maintained at a temperature between 40° and 50° C. After this addition, the mixture is stirred at 50–55° C. for five hours longer, then cooled, acidified with dilute hydrochloric acid and taken up in an equal volume of ethylene dichloride. The lower ethylene dichloride layer is separated, washed with water, and distilled in vacuo. The product distills at 197–204° C./1 mm. as a yellow oil, weighing 185 g., having the formula:

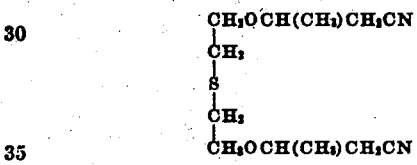

Example 5

*Glyceryl-di-(ω-cyano-isopropyl) ether*

Allyl cyanide (100.5 g.) is added dropwise during one hour to a stirred solution of 46 g. of glycerol, 40 g. of tertiary butanol, and 5 g. of aqueous 40% trimethyl benzyl ammonium hydroxide while the reaction mixture was stirred and maintained at a temperature between 38° and 45° C. by frequent cooling. The mixture is heated thereafter for one hour at 50–60° C. and finally one and one-half hours at 70–75° C. until a clear homogenous solution is obtained. It is allowed to stand 24 hours longer at ordinary room temperature, then acidified with 10% hydrochloric acid and shaken with an equal volume of ethylene dichloride. The ethylene dichloride layer is separated and evaporated to dryness in vacuo on a steam bath. The residual oil weighing 117 g. is distilled in vacuo. The main fraction (92 g.) distills between 200° and 230° C/1 mm. Upon redistillation it boils at 205°–215° C./1 mm. and forms a pale yellow liquid consisting essentially of the di-ether having the probable formula:

or

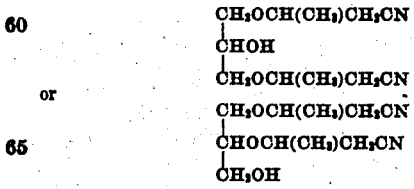

or a mixture of both.

A small quantity of higher boiling oil (B. P. 250–260° C./1 mm.) is also obtained consisting essentially of the glyceryl-tri-ω-cyano-isopropyl)-ether.

Example 6

Allyl cyanide (134 g.) is added dropwise during two hours to a stirred mixture of 150 g. of triethylene glycol, 50 g. of tertiary butanol, and 10 g. of aqueous 40% trimethyl benzyl ammonium hydroxide while the exothermal reaction mixture is maintained between 45–55° C. by occasional cooling. The mixture is stirred for 20 hours thereafter at room temperature and finally heated for five hours at 50° C. to complete the reaction. The cooled product is acidified with dilute hydrochloric acid, taken up in an equal volume of ethylene dichloride and the ethylene dichloride layer separated and evaporated to dryness under reduced pressure on a steam bath. The residual oil, weighing 252 g., is distilled in vacuo. The fraction boiling at 150–160° C./1 mm. is a colorless oil and consists essentially of the mono-ω-cyano-isopropyl ether of triethylene glycol, having the formula:

HOCH$_2$CH$_2$OCH$_2$CH$_2$OCH$_2$CH$_2$OCH(CH$_3$)CH$_2$CN

The yield is about 70 g. The fraction boiling at 200–205° C./1 mm. is a pale yellow oil weighing 90 g. having the formula:

NCCH$_2$(CH$_3$)CHOCH$_2$CH$_2$OCH$_2$
CH$_2$OCH$_2$CH$_2$OCH(CH$_3$)CH$_2$CN

Example 7

To a solution of 34 g. of pentaerythrite, 50 g. of water and 2 g. of sodium hydroxide there is added 67 g. of allyl cyanide during twenty minutes while the reaction mixture was stirred and maintained at a temperature between 38° and 40° C. The mixture is then heated and stirred at 50–55° C. for nine hours and allowed to stand at room temperature for 24 hours. Two layers form. The mixture is faintly acidified with dilute hydrochloric acid and shaken with an equal volume of ethylene dichloride. The ethylene dichloride layer is separated, washed with 50 cc. of water, and then evaporated to dryness on a steam bath under reduced pressure. The residue is a pale amber syrup weighing 60 g. containing 11.7% nitrogen. It is readily soluble in acetone. It consists essentially of a mixture of di-, tri-, and tetra-ω-cyano-isopropyl ethers of pentaerythrite.

In the same manner sorbitol, inositol, or mannitol in 2% aqueous potassium hydroxide solution reacts with from one to six mols of crotononitrile (or allyl cyanide) to give the corresponding mono- or poly-ω-cyano-isopropyl ethers, as thick, syrup-like products.

Example 8

Allyl cyanide (134 g.) is added dropwise to a stirred mixture of 106 g. of glyceryl-α-methyl ether, 50 g. of tertiary butanol, and 10 g. of aqueous 40% trimethyl benzyl ammonium hydroxide at 40–45° C. After the addition is completed, the mixture is stirred six hours at 60–70° C., cooled, neutralized with dilute hydrochloric acid and extracted with an equal volume of ethylene dichloride. The ethylene dichloride layer is separated and dried under reduced pressure. The residual oil, upon fractionation in vacuo, yields two products, namely the mono-cyano isopropyl ether of glyceryl-α-methyl ether, a colorless liquid boiling at 123–126° C./1 mm., and the di-substituted product

CH$_2$OCH$_3$
|
CHOCH(CH$_3$)CH$_2$CN
|
CH$_2$OCH(CH$_3$)CH$_2$CN boiling at 170–173° C./1 mm.

I claim:
1. As a new compound, a bis-ω-cyano-isopropyl ether of an alkylene glycol.
2. As a new compound, a bis-ω-cyano-isopropyl ether of a polyethylene glycol.
3. Bis-(ω-cyano-isopropoxy)-ethane-1,2.
4. Bis-(ω-cyano-isopropoxy)-propane-1,2.
5. Bis-(ω-cyano-isopropoxy)-diethyl ether.
6. As a new compound, a poly-ω-cyano-isopropyl ether of an aliphatic alcohol having from two to six, inclusive, hydroxyl groups per molecule.

HERMAN A. BRUSON.